United States Patent [19]

Fitzpatrick-Ellis et al.

[11] Patent Number: 5,250,144
[45] Date of Patent: Oct. 5, 1993

[54] BONDING APPARATUS

[75] Inventors: John F. Fitzpatrick-Ellis, Warwick; John S. Bolton, Solihull; Richard C. M. Cooke, Warwick, all of United Kingdom

[73] Assignee: Automotive Products PLC, United Kingdom

[21] Appl. No.: 668,508

[22] PCT Filed: Sep. 27, 1989

[86] PCT No.: PCT/GB89/01143
§ 371 Date: Mar. 26, 1991
§ 102(e) Date: Mar. 26, 1991

[87] PCT Pub. No.: WO90/03526
PCT Pub. Date: Apr. 5, 1990

[30] Foreign Application Priority Data

Sep. 27, 1988 [GB] United Kingdom ............... 8822671

[51] Int. Cl.⁵ ............................................. B32B 31/00
[52] U.S. Cl. .................................. 156/556; 156/285; 156/382; 156/245; 156/538
[58] Field of Search ............... 156/556, 382, 285, 286, 156/245, 538

[56] References Cited

U.S. PATENT DOCUMENTS

| | | | |
|---|---|---|---|
| 2,483,234 | 9/1949 | Roberts | 156/286 X |
| 3,752,726 | 8/1973 | Barefoot | 156/382 |
| 3,793,115 | 2/1974 | Jindra | 156/382 X |
| 4,908,087 | 3/1990 | Murooka et al. | 156/382 X |

FOREIGN PATENT DOCUMENTS

| | | |
|---|---|---|
| 2063725 | 12/1970 | Fed. Rep. of Germany . |
| 60-30327 | 2/1985 | Japan . |
| 2113603 | 1/1983 | United Kingdom . |
| 2184387 | 6/1987 | United Kingdom . |

Primary Examiner—David A. Simmons
Assistant Examiner—James J. Engel, Jr.
Attorney, Agent, or Firm—Davis, Bujold & Streck

[57] ABSTRACT

A bonding apparatus, for example for a friction facings and carrier plate assembly for use in a friction clutch driven plate, comprises first and second platens (22, 70) which are mountable one over the other such that a first surface on one platen faces towards a first surface on the other platen. Each said first surface has an annular recess (30, 78) therein such that when the platens are mounted one on top the other said annular recesses substantially coincide and are substantially co-axial. Each recess has a base (38, 84) with a substantially flat surface (40, 86) at the bottom of the recess, and each base has means such as apertures (92) or suction cups (104, 114) therein opening to the recess and connectable with a source of vacuum to apply vacuum to the recess. A pair of annular friction facings (10, 12) are bonded to opposite sides of a carrier plate (4) to form a friction facings and carrier plate assembly (2) by using the bonding apparatus to hold a respective annular friction facing (10, 12) flat against the base (38, 84) of a respective recess (30, 78) in each said platen (22, 70) by applying said vacuum in the course of a said carrier plate (4) disposed between the two platens being bonded to the friction facings by adhesive (14, 14') interposed between each friction facing and the carrier plate.

10 Claims, 4 Drawing Sheets

BONDING APPARATUS

This invention concerns bonding apparatus and also concerns a method of bonding using the apparatus.

SUMMARY OF THE INVENTION

The apparatus and method are to be used in the bonding, using adhesive, of two annular facings of friction material each adhered to an opposite side of a carrier plate to form a friction facings and carrier plate assembly which can be used in the construction of a friction clutch driven plate. That driven plate can be of a type for use in a friction clutch interposed between an internal combustion engine and a change-speed gear box in a drive-line of a motor vehicle.

According to a first aspect of the invention there is provided a bonding apparatus comprising first and second platens mountable one over the other such that a first surface on one platen faces towards a first surface on the other platen, each said first surface having an annular recess therein such that when the platens are mounted one on top of the other said annular recesses substantially coincide and are substantially co-axial, each recess having a base with a substantially flat surface at the bottom of the recess, and each base having means therein opening to the recess and connectable with a source of vacuum to apply vacuum to the recess.

According to a second aspect of the invention there is provided a method of bonding a pair of annular friction facings to opposite sides of a carrier plate to form a friction facings and carrier plate assembly using the bonding apparatus according to the first aspect, said method comprising holding a respective annular friction facing flat against the base of the respective recess in each said platen by applying said vacuum in the course of a said carrier plate disposed between the two platens being bonded to the friction facings by adhesive interposed between each friction facing and the carrier plate.

BRIEF DESCRIPTION OF THE DRAWINGS

Each aspect of the invention will now be further described, by way of example, with reference to the accompanying drawings in which.

DETAILED DESCRIPTION OF THE INVENTION

Figure 1:
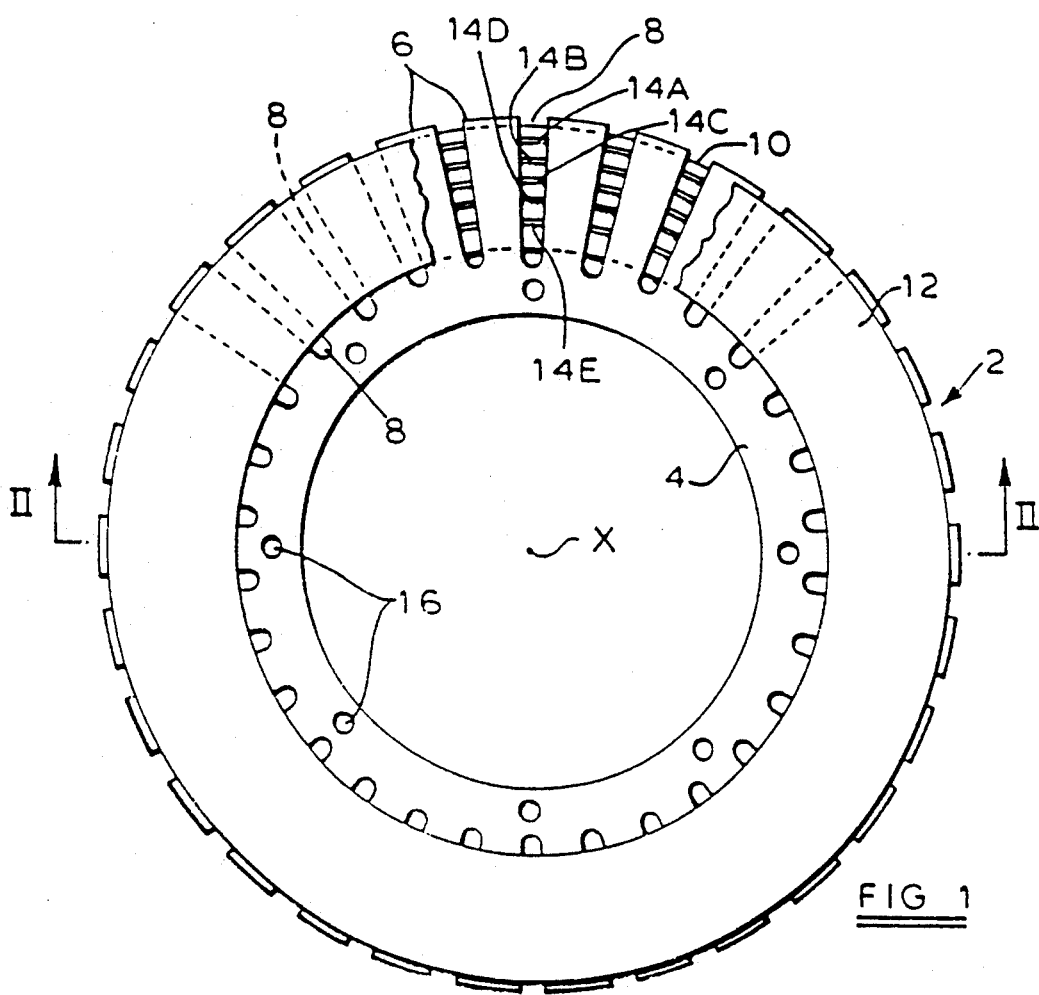
FIG. 1 is a plan view, partially fragmented, of a friction facings and carrier plate assembly which can be bonded using each aspect of the invention.
Figure 2:
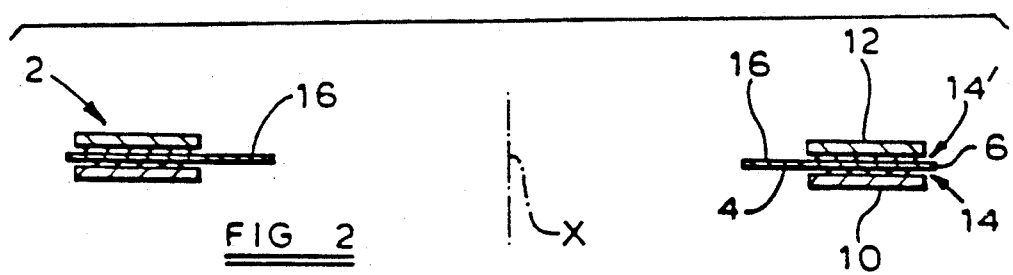
FIG. 2 is a section on line II—II in FIG. 1.

Referring firstly to FIGS. 1 and 2, a friction facings and carrier plate assembly 2 comprises an annular carrier plate 4 of, for example metal, substantially centred on axis X and having a plurality of resiliently pliable, radial blades or paddles 6 at its outer periphery. The paddles 6 are spaced one from another by radial slots 8. Two friction facings 10,12, each formed by a pliable, integral annulus of friction material, are bonded to opposite sides of the paddles by respective layers 14,14' of adhesive. The adhesive can be an elastomer, for example a room temperature vulcanizable silicone rubber. Each elastomer layer 14,14' is formed by a plurality of radially spaced bead portions of the elastomer. For example the elastomer layer 14 is formed by a plurality of elastomer beads 14A,14B,14C,14D and 14E arranged as radially spaced, substantially concentric circles centred on the axis X. The layer 14' is also formed, for example, of elastomer beads in the form of concentric circles. As can be seen in FIG. 2 the beads of the layer 14 are each disposed opposite to the radial space between each pair of adjacent beads of elastomer in the layer 14'. Alternatively, each layer 14 or 14' can be formed by a bead of elastomer in the form of a spiral centred on the axis X so arranged that each turn of at least part of the spiral forming one elastomer layer is opposite the space between two adjacent turns of the spiral forming the other elastomer layer.

The carrier plate 4 has apertures 16 to receive rivets (not shown) for securing the assembly 2 to a side plate (not shown) on a central hub of a clutch driven plate incorporating the assembly 2.

Figure 3:
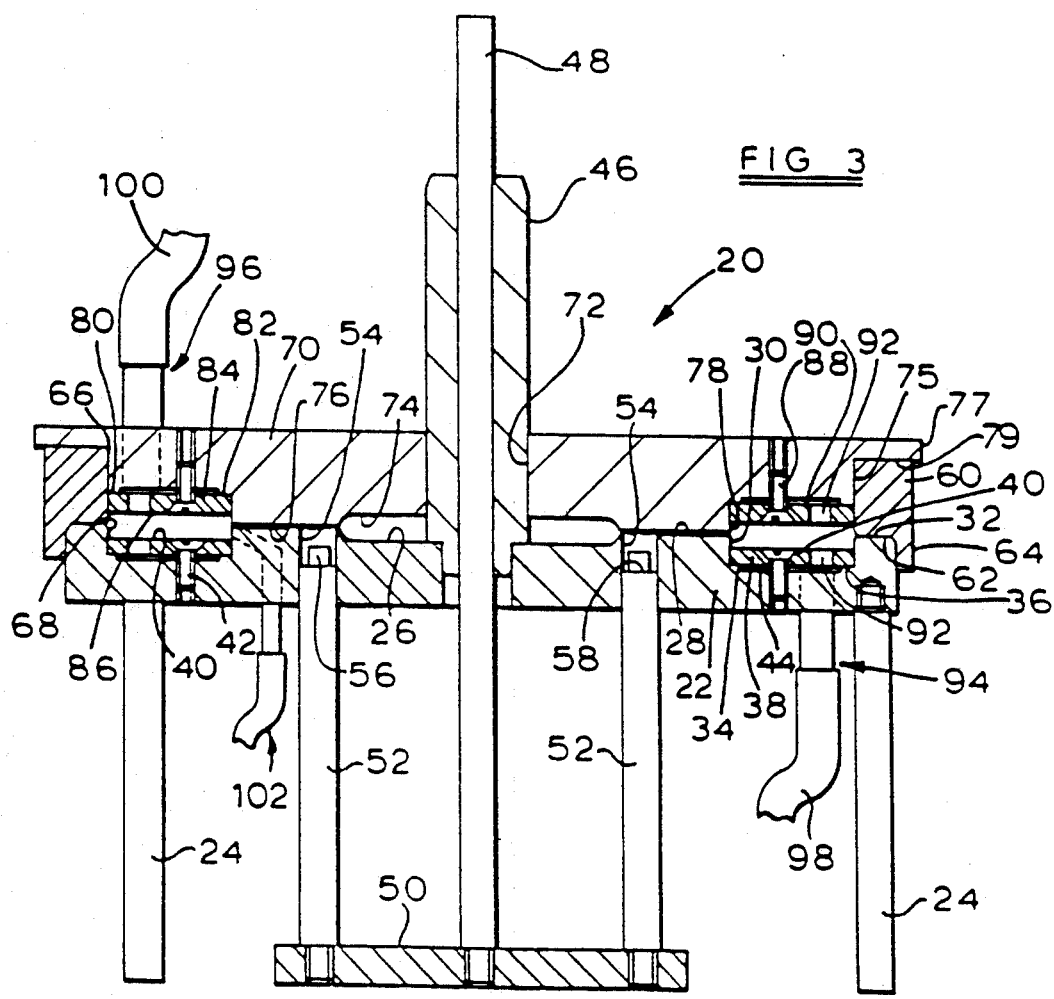
FIG. 3 shows, partly in section, an embodiment of a bonding apparatus formed according to the first aspect of the invention.
Figure 4:
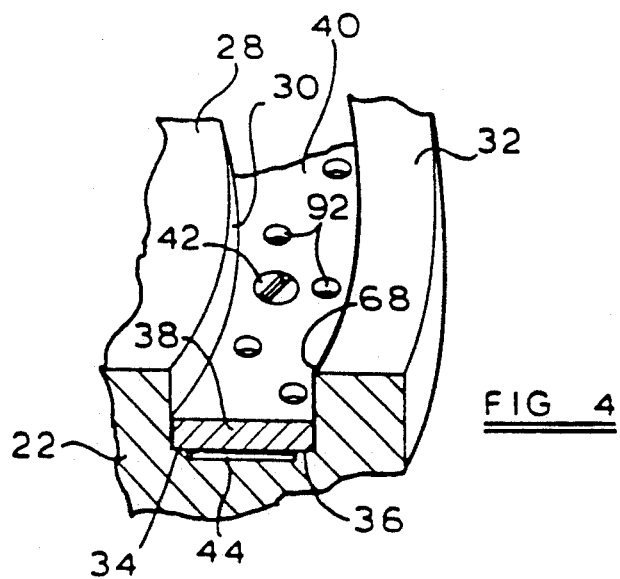
FIG. 4 shows a fragment of the apparatus in FIG. 3 but on a larger scale than in FIG. 3.
Figure 5:
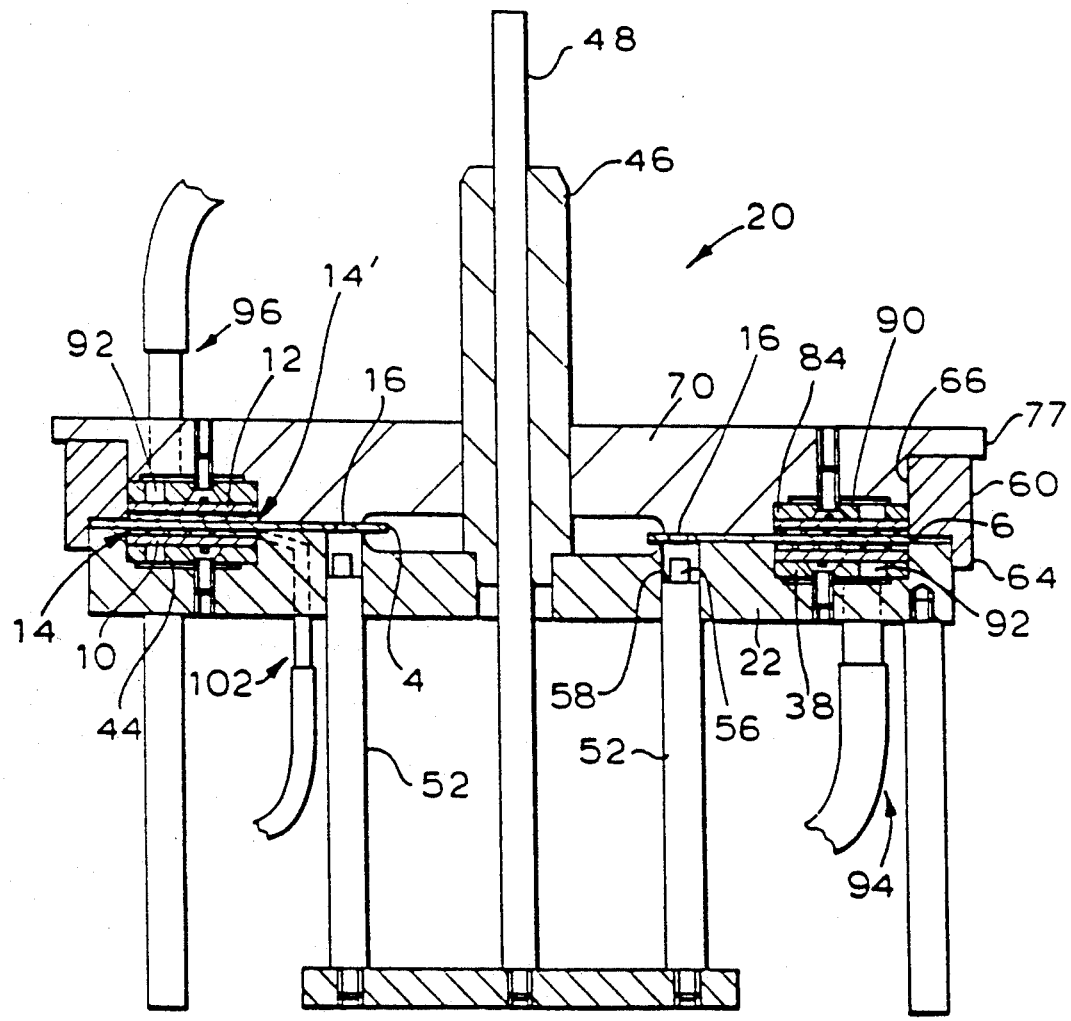
FIG. 5 shows the apparatus in FIG. 3 in the course of performance of the method according to the second aspect of the invention to produce a friction facings and carrier plate assembly similar to that in FIG. 1.

Apparatus useful in the manufacture of the assembly 2, and to ensure that the adhesive layers 14,14' are each of a desired pre-determined thickness, is shown at 20 in FIGS. 3 to 5. The apparatus 20 comprises a circular lower platen 22 standing on four legs 24 (only two shown). Centrally the platen 22 has a circular recess 26 surrounded by a flat annular land 28 surrounded by an annular recess 30 in turn surrounded by an annular, peripheral lip or land 32. The recess 30 has two annular shoulders 34 and 36 in which sits an annular base plate 38 having a flat, horizontal surface 40. Screws 42 secure the base plate 38 to the platen 22. Immediately below the base plate 38 is an annular chamber 44.

A vertical tube 46 fast with the platen 22 ascends from the centre thereof. A vertical rod 48 is a sliding fit in the bore of tube 46 and is secured at its lower end to the centre of a circular base plate 50 to which are secured four vertical arms 52 (only two shown) angularly spaced by 90° one from another and being a sliding fit each in a respective vertical bore 54 through the platen 22 and opening to the surface of the land 28. Each arm 52 has an upper end in the form of reduced diameter spigot 56 surrounded by an annular shoulder 58, all the spigots being below the surface of land 28 when the legs 24 and plate 50 are all standing on the same horizontal flat surface.

A removable, circular ring 60 has in its underside, a rebate 62 into which fits the land 32 surrounded by skirt 64 on the ring to locate the latter on the lower platen to maintain an inner, cylindrical vertical face 66 of the ring in substantial alignment with an outer, cylindrical, vertical surface 68 of the recess 30.

A circular upper platen 70 sits removably in and on the ring 60 and has a central bore 72 which is a sliding fit about the tube 46. A circular recess 74 in the upper platen 70 surrounds the bore 72. Platen 70 has a flat annular land 76 surrounding the recess 74. In turn, an annular recess 78 in the platen surrounds the land 76. That recess 78 opens to a peripheral rebate 75 in the platen 70, which rebate provides the upper platen with a peripheral lip 77 having a horizontal, flat under-face 79 for sitting on the ring 60 so that the ring locates the platen 70 radially and holds the recess 78 in register with the recess 30. Whilst the platen 70 is sitting on the ring 60 the face 66 of the latter provides the outer peripheral boundary of the recess 78.

The recess 78 has two annular shoulders 80 and 82 on which sits an annular base plate 84 having a flat horizontal surface 86. Screws 88 secure the base plate 84 to the platen 70. Immediately behind the base plate 84 is an annular chamber 90.

Base plates 38 and 84 are each formed with a plurality of through holes 92 opening to either the chamber 44 or 90 connected to a source of vacuum (not shown) by a conduit 94 or 96 comprising a flexible pipe 90 or 100.

Preferably the platen 70 and the ring 60 are relatively heavy.

To use the apparatus 20 in the manufacture of an assembly 2, the platen 70 and ring 60 are initially removed from the platen 22. Vacuum from the aforesaid source is applied to the chambers 44 and 90 and the platen 70 is disposed in an inverted attitude so that entrance to the recess 78 is from above. An annular friction facing 10 is placed in the recess 30 and is pressed flat against the surface 40 of the base plate 38 so that the applied vacuum acts hold the facing 10 flat. Likewise an annular friction facing 12 is placed in the recess 70 and held flat against the surface 86 of the base plate 84 by vacuum. This holding flat of the friction facings 10 and 12 is desirable, in the control of the thickness of the adhesive layers 14, 14', because the prior moulded friction facings used can have a warped or wavy shape. Now a layer 14 of adhesive in a paste or flowable form is applied to the friction facing 10 in the recess 30 and a layer 14' of adhesive is applied to the friction facing 12 in the recess 78. Alternatively, the adhesive layers 14 and 14' can be initially applied to the friction facings 10 and 12 respectively, and then the friction facings placed in the recesses 30 and 78 to be held flat by the applied vacuum.

A carrier plate 4 is now placed on the lower platen 22 (FIG. 5) so that its paddles 6 come into contact with the adhesive layer 14. The outer tips of the paddles rest on the peripheral lip 32, and radially inwardly of the paddles the plate 4 rests on the land 28 preferably with four of the apertures 16 each in register with a respective said bore 54. This latter may be achieved by first lifting the rod 48 to raise the arms 52 so that the carrier plate 4 can be placed on the arms to sit on the shoulders 58 by introducing the spigots 56 into four respective apertures 16. Then the rod 48 is lowered to lower the carrier plate 4 into position (FIG. 5). Now the ring 60 is placed in position to sit on top of the ends of the paddles 6. Thereafter the platen 70 with the friction facing 12 held therein by suction is turned over and placed on the ring 60 as shown in (FIG. 5) so that adhesive layer 14' is applied against the upper faces of the paddles 6. Radially inwardly of the paddles 6 the carrier plate 4 is clamped between the lands 28,76.

Now with the vacuum still applied, the adhesive is allowed to set. In the case of the adhesive being an elastomer, for example a silicone rubber, the expression "setting" is to be understood as "curing" or "vulcanizing". This may be promoted by exposing the elastomer to an ambient atmosphere of a predetermined character, for example air of predetermined temperature and relative humidity. Such air or other gaseous matter can be introduced into the annular chamber formed by the recesses 30, 78 through a conduit arrangement 102 extending in the lower platen 22. This gas can permeate between the friction facings 10,12 in a zig-zag manner around the beads of adhesive and along the slots 8 to the outer periphery of the assembly 2. An outlet for the gas may be provided at the ring 60.

When the adhesive has set to the desired extent, the vacuum is turned off. The upper platen 70 and the ring 60 are lifted off the newly formed assembly 2. Then the rod 48 is lifted causing the arms 52 to be raised and lift the assembly 2 from the recess 30, from which arms the friction facings and carrier plate assembly 2 can be removed.

The bonded friction facings and carrier plate assembly 2 can be of the kind described in our published European Patent Application No. 0 252 583.

Where the adhesive is an elastomer and it is desired that each resilient layer 14,14' should be axially compressible by a desired amount, then this can be achieved by ensuring that each layer 14,14' in an uncompressed state is of a predetermined thickness. If the axial thickness of the friction facings 10,12 is always the same, then the predetermined thickness of the elastomeric layer 14 can be varied by using another base plate 38 of a different axial thickness. Likewise the thickness of the elastomeric layer 14' can be varied by using another base plate 84 of a different axial thickness. Because the base plates are held in position by removable screws 42,88 there can be a set of interchangeable base plates 38 each of a different axial thickness, and similarly a set of interchangeable base plates 84.

Figure 6:
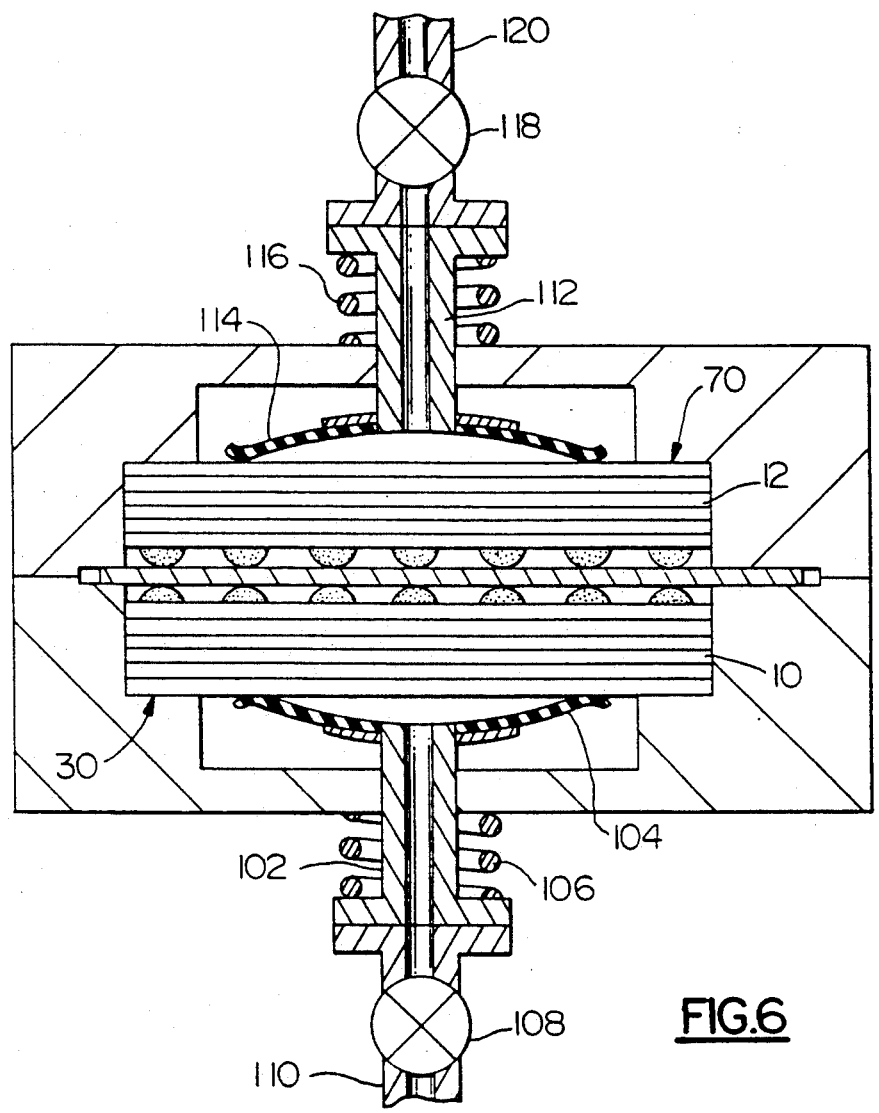
FIG. 6 is a cross-sectional view of an alternative embodiment of a part of a bonding apparatus according to the first aspect of the invention.

FIG. 6 shows a part of an alternative embodiment of a bonding apparatus according to the present invention. The remaining parts of the bonding apparatus are essentially the same as the corresponding parts shown in FIGS. 3-5 and the same reference numerals are used to indicate the same or similar parts. FIG. 6 shows that the annular friction facing 10 is retained in the recess 30 by vacuum applied by way of a pipe 102 and a suction cup 104 which may be made, for example, of rubber or a resilient metallic or plastics material. The suction cup 104 is arranged in a depression formed at the base of the recess. Biasing means such as a coil spring 106 holds the friction facing 10 flat against the base of the recess 30. A valve 108 permits vacuum pipe 110 to be disconnected from the apparatus during bonding. Similarly, annular friction facing 12 is retained in recess 70 by vacuum applied by way of a pipe 112 and a suction cup 114 which is arranged in a depression formed at the base of the recess. A coil spring 116 holds the friction facing 12 flat against the base of the recess 70 and a valve 118 permits vacuum pipe 120 to be disconnected from the apparatus during bonding.

We claim:

1. A bonding apparatus for adhesive bonding a pair of annular friction facings of predetermined thickness to a carrier plate by means of adhesive, the apparatus comprising top and bottom platens mountable one over the other such that a first surface on the top platen faces towards a first surface on the bottom platen, each said first surface having an annular recess therein to receive a friction facing and an annular land radially outwardly thereof such that when the platens are mounted one on top of the other said annular recesses and lands substantially coincide and are substantially co-axial, each recess having a depth equal to the thickness of a friction facing plus a desired thickness of adhesive and having a base with a substantially flat surface at the bottom of the recess, with each base having apertures therein opening to the recess and connectable with a source of vacuum to apply vacuum to the recess and said lands cooperating for clamping the carrier therebetween to hold the carrier during bonding.

2. An apparatus as claimed in claim 1, in which at least one of said platens is provided with conduit means leading to a said recess and said conduit means being for introducing a desired gaseous atmosphere into said recess.

3. An apparatus as claimed in claim 1, wherein the top platen is guided for vertical movement relative to the bottom platen by a guide pin sliding in a tube, the guide pin being connected to a plate on which are mounted push off pins provided for at least one of lowering and lifting a carrier plate relative to the bottom platen when said carrier is to be or has been bonded to a friction facing.

4. A bonding apparatus comprising first and second platens mountable one over the other such that a first surface on one platen faces towards a first surface on the other platen, each said first surface having an annular recess therein such that, when the platens are mounted one on top of the other, said annular recesses substantially coincide and are substantially co-axial, each recess having a base with a substantially flat surface at the bottom of the recess, and each base having means therein opening to the recess and connectable with a source of vacuum to apply vacuum to the recess, and the base of a said recess comprises a removable plate.

5. An apparatus as claimed in claim 4, in which said removable plate is one of a plurality of such plates each of a different thickness.

6. A bonding apparatus comprising first and second platens mountable one over the other such that a first surface on one platen faces towards a first surface on the other platen, each said first surface having an annular recess therein such that, when the platens are mounted one on top of the other, said annular recesses substantially coincide and are substantially co-axial, each recess having a base with a substantially flat surface at the bottom of the recess, and each base having means therein opening to the recess and connectable with a source of vacuum to apply vacuum to the recess, wherein a carriage is provided for at least one of lowering and lifting a carrier plate relative to the first platen when said carrier plate is to be or has been bonded to a friction facing.

7. A bonding apparatus comprising first and second platens mountable one over the other such that a first surface on one platen faces towards a first surface on the other platen, each said first surface having an annular recess therein such that, when the platens are mounted one on top of the other, said annular recesses substantially coincide and are substantially co-axial, each recess having a base with a substantially flat surface at the bottom of the recess, and each base having means therein opening to the recess and connectable with a source of vacuum to apply vacuum to the recess, wherein a removable ring is mountable on the first platen and the second platen is removably mountable on the ring, the ring being engagable with the platens as to locate the second platen radially with respect to the first platen.

8. A method of bonding a pair of annular fiction facings to opposite sides of a carrier plate to form friction facings and carrier plate assembly in a bonding apparatus comprising first and second platens mountable one over the other such that a first surface on one platen faces towards a first surface on the other platen, each said first surface having an annular recess therein such that, when the platens are mounted one on top of the other, said annular recesses substantially coincide and are substantially co-axial, each recess having a base with a substantially flat surface at the bottom of the recess, and each base having means therein opening to the recess and connectable with a source of vacuum to apply vacuum to the recess, said method comprising holding a respective annular friction facing flat against the base of a respective recess in each platen of the bonding apparatus by applying a vacuum, locating said carrier plate between the two platens with a layer of adhesive between the carrier plate and each respective friction facing, and bringing the platens together to effect bonding of the friction facings to the carrier plate.

9. A method as claimed in claim 8, in which the adhesive is an elastomer.

10. A method as claimed in claim 9, in which air at a predetermined temperature and relative humidity is introduced in said recess to provide the ambient atmosphere for said elastomer in the course of vulcanizing the elastomer.

* * * * *